J. E. WEBSTER.
GEAR SHIFTING MECHANISM.
APPLICATION FILED DEC. 4, 1914. RENEWED APR. 2, 1920.

1,363,701.

Patented Dec. 28, 1920.
2 SHEETS—SHEET 2.

WITNESSES:
M. A. Schubeler.
J. R. Langley.

INVENTOR
John E. Webster
BY
Wisley E. Carr
ATTORNEY

UNITED STATES PATENT OFFICE.

JOHN E. WEBSTER, OF PITTSBURGH, PENNSYLVANIA, ASSIGNOR TO WESTINGHOUSE ELECTRIC AND MANUFACTURING COMPANY, A CORPORATION OF PENNSYLVANIA.

GEAR-SHIFTING MECHANISM.

1,363,701.     Specification of Letters Patent.    Patented Dec. 28, 1920.

Application filed December 4, 1914, Serial No. 875,437. Renewed April 2, 1920. Serial No. 370,899.

*To all whom it may concern:*

Be it known that I, JOHN E. WEBSTER, a citizen of the United States, and a resident of Pittsburgh, in the county of Allegheny and State of Pennsylvania, have invented a new and useful Improvement in Gear-Shifting Mechanism, of which the following is a specification.

My invention relates to gear-shifting mechanisms and particularly to such mechanisms as are controlled by selective devices and are actuated by the usual clutch pedal to control the shiftable gear wheels of the transmission mechanisms of automobiles or other motor vehicles.

My invention has for its object to provide an arrangement whereby the means for selectively controlling the gear-shifting mechanism is automatically returned to its position corresponding to the neutral position of the transmission mechanism.

According to my present invention, I provide a simple arrangement comprising a latching mechanism for controlling the connection of the clutch-pedal lever to the means for selectively controlling the gear-shifting mechanism. This construction insures that the operation of the clutch pedal to perform its normal functions will not, in any way, affect the position of the selective controlling means unless the operator has previously actuated the clutch pedal through an abnormal path of movement of such length that an operative connection is established. The gear-shifting mechanism is similar in detail to that disclosed in a copending application, Serial No. 825,725, filed March 18, 1914, the assignee of which is also the assignee of the present application.

Figure 1:
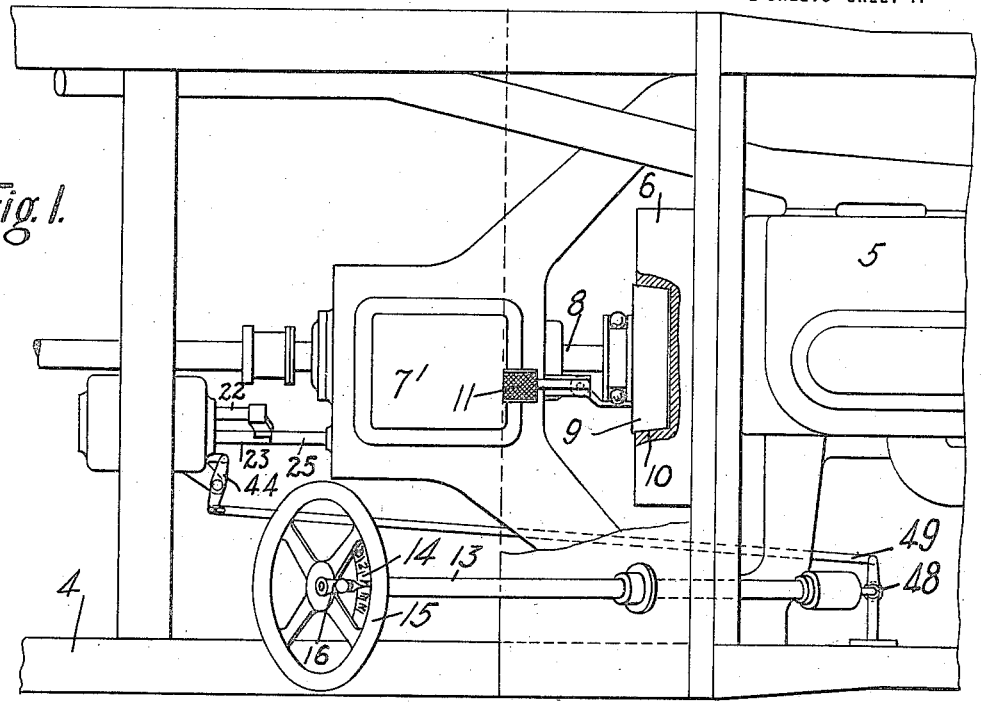
Figure 2:
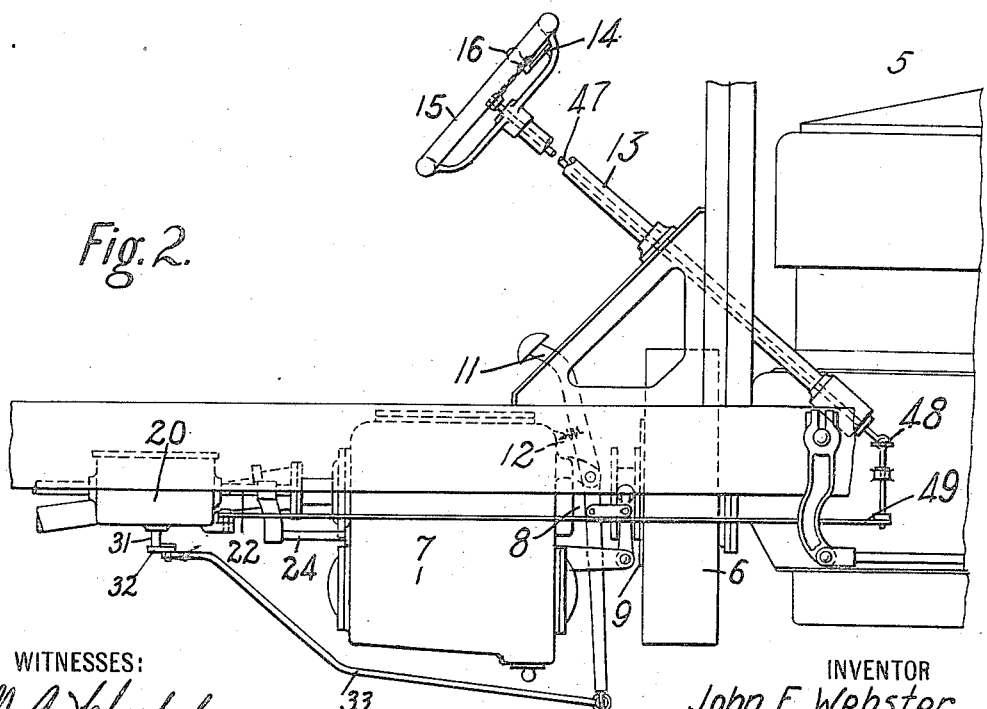
Figure 3:
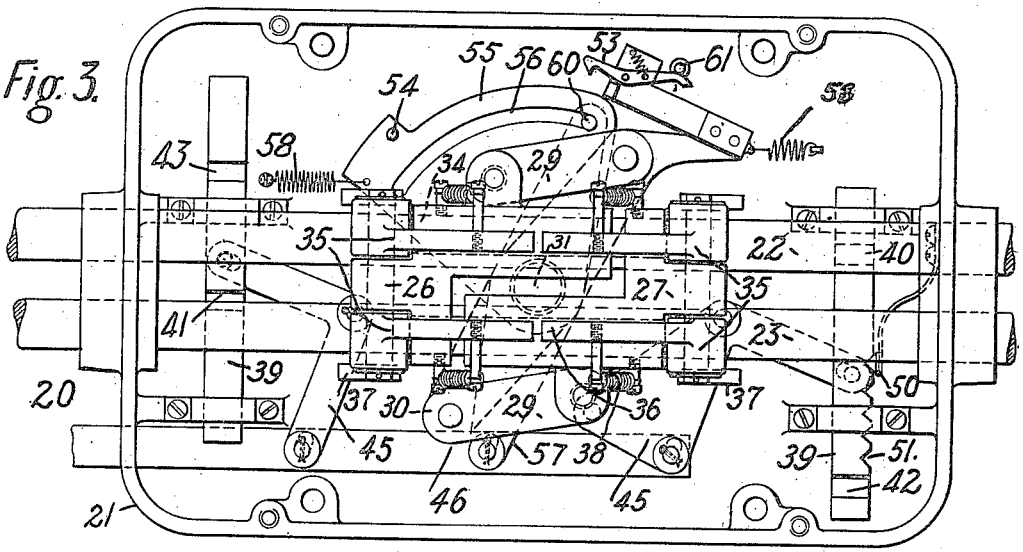
Figure 4:
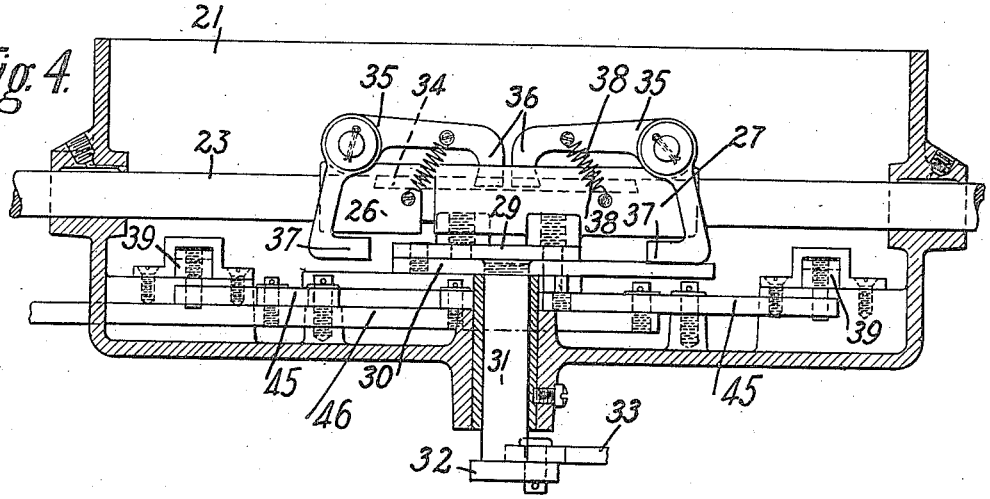
Figure 5:
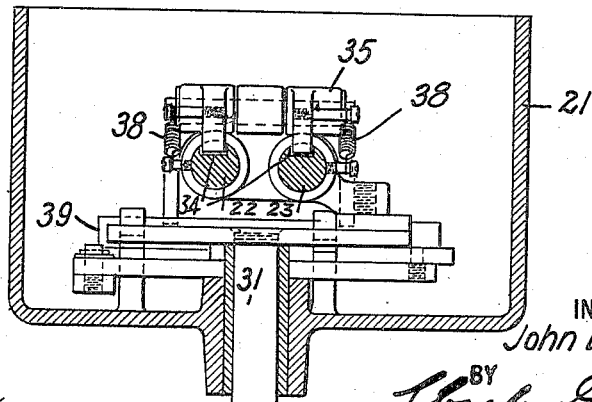

In the accompanying drawings, Figure 1 is a view, partially in plan and partially in section, of a portion of an automobile with my invention attached thereto. Fig. 2 is a view, in elevation, of the mechanism of Fig. 1. Fig. 3 is a plan view of the gear-shifting mechanism. Fig. 4 is a view, in longitudinal section, of the mechanism of Fig. 3. Fig. 5 is a view, in transverse section, of the mechanism of Fig. 3.

Referring particularly to Figs. 1 and 2, an automobile chassis 4, only a portion of which is shown, is provided with a gas engine 5 having a fly wheel 6. A transmission mechanism or change-speed mechanism 7 is connected to the engine 2 by a shaft 8 and a conical clutch member 9 that is slidably mounted on the shaft 5 to coact with a correspondingly shaped clutch member 10 formed in the fly wheel 6. The clutch member 9 is controlled by a clutch-pedal lever 11 that is normally retained in its illustrated position by a spring 12.

The automobile comprises further a steering post 13 that is provided with a dial 14 adjacent to the steering wheel 15. The dial 14 is provided with characters corresponding to the several speed ratios for which the transmission mechanism may be adjusted, as, for example, 1, 2, 3, N (neutral) and R (reverse). A selector lever 16, which is rotatably supported by the steering post 13, selectively controls the shifting of the gear wheels of the transmission mechanism, as will be later described. The transmission mechanism 7 forms no part of the present invention and the details thereof are accordingly omitted as being unnecessary to an understanding of the operation of the gear-shifting mechanism. It will be assumed that the transmission mechanism is of the usual type which comprises movable gear wheels.

Referring now to Figs. 3, 4 and 5, a gear-shifting mechanism 20 comprises a housing or casing 21 having end walls which provide bearings for two shift rods 22 and 23. The shift rods 22 and 23 are respectively connected to the shift rods 24 and 25 of the transmission mechanism. Two block members 26 and 27, of substantially L-shape, are slidably mounted upon the shift rods 22 and 23. The block members 26 and 27 are connected by links 29 to a lever 30 that is carried by a rock shaft 31. A crank arm 32 is mounted on the lower end of the rock shaft 31 and is connected to the clutch-pedal lever 11 by a link 33. The link 33 has a pin-and-slot connection to the arm 32 to afford lost motion between the pedal lever and the arm. The actuation of the pedal lever 11 beyond its clutch-disengaging position, operates through the connected mechanism just described to actuate the blocks 26 and 27 in opposite directions simultaneously.

Each of the shift rods 22 and 23 is provided with a longitudinal groove 34. Four dogs 35, that are pivotally mounted on opposite sides of the blocks 26 and 27, are each provided, at one end, with a hook portion 36 for engaging the respective shift rods 22 and 23 at the ends of the grooves 34. Each of the dogs is provided, at its opposite end, with a horizontally extending portion 37. Normally, the dogs 35 are retained in their illustrated positions by springs 38, with the hook portions 36 resting upon the bottoms of the grooves 34.

The positions of the dogs 35, relatively to the shift rods 22 and 23, are controlled by two selector bars 39 that are mounted for movement transverse to that of the shift rods 22 and 23. The bars 39 are respectively provided with notches or slots 40 and 41, and 42 and 43 which coact with the corresponding dogs 35, according to the positions of the bars. The selector bars 39 are connected to a lever 44 by means of bell cranks 45 and a link 46.

The selector lever 16 is fixed to a rock shaft 47 that is rotatably mounted in the hollow steering post 13 and is connected to the link 46 by means of a universal joint 48 and a linkage mechanism 49. The positions of the bars 39 are thus controlled by the position of the selector lever 16 as it is adjusted for various speeds. The bars 39 are yieldingly held in the several positions to which they may be adjusted by an accentuating device comprising a spring-pressed dog 50 which coacts with notches 51 on one of the bars 39.

The lever 30, which is connected to the rock shaft 31 and oscillates therewith, is provided, at one end, with a latch 53 for engaging a pin 54 that is mounted on a sector 55. The sector 55, which is pivotally mounted on the rock shaft 31 has a curved slot 56 to provide a lost-motion connection between it and a lever 57 that is connected to the link 46 of the control mechanism for the selector bars. A spring 58 normally retains the sector 55 in its illustrated position.

It may be assumed that the transmission gear mechanism is in its neutral position and that the gear-shifting mechanism is in its corresponding normal or neutral position. It may be assumed further that the engine has been started and that the engine clutch members 9 and 10 are engaged. As it is desirable to start the vehicle on first speed, the selector lever 16 is adjusted to register with the numeral 1 on the dial 14. The bars 39 are adjusted thereby to bring the slot 40 into alinement with the path of movement of the corresponding dog 35, and the movement of the latter is therefore unobstructed. The remaining slots, however, are not in alinement with the corresponding dogs 35, and the bars 39 are in such positions as to obstruct the movements of the remaining dogs 35.

The clutch-pedal lever 11 is then pressed forwardly beyond the clutch-disengaging position to rock the lever 30 and thus actuate the blocks 26 and 27 outwardly from their neutral positions. During the initial portion of this movement, the hook portions 36 of the dogs 35 slide along the grooves 34. When the hook portions 36 approach the ends of the grooves, the lower portions of the dogs 35, with the exception of that one coacting with the slot 40, engage the corresponding bars 39 and are rocked about their pivots to raise the hook portions 36 from the grooves.

Further movement of the blocks causes the dog 35 that is not so rocked to engage the shift rod 22 and move it to the right, (Figs. 3 and 4) to effect the necessary change in the transmission mechanism 4. At the extremity of the path of movement of the pedal lever 11, the lever 30 has oscillated to the left, as viewed in the drawing, a sufficient distance to permit the engagement of the pivoted latch member 53 with the pin 54 on its sector 55.

When the change in speed ratios has been effected, the operator allows the spring 12 to retract the clutch-pedal lever 11. A spring 59, that is attached, at one end, to a stationary part and, at the other end, to the lever 30, returns the blocks 26 and 27 and the rock shaft 31 to their respective normal positions. During the initial portion of this movement, the sector 55 is actuated to the right, as viewed in the drawing by the lever 30 which is connected to the rock shaft 31.

When the lever 30 has traversed the greater portion of its path of movement in returning to its normal position, a pin 60, that is mounted on the lever 57, is engaged by the end of the groove 56 of the sector 55, and the link 46 and its connected mechanism are actuated to return the selective mechanism to its neutral position. The lever 57 and the connected parts then occupy their illustrated positions. When the lever 30 has returned to its normal position, the latch 53 engages a stationary stop 61, which causes it to release the pin 54, and the sector 55 is returned to its normal position by the spring 58. The lever 57 is then free to move relatively to the sector 55 for adjustment by the selector lever 16.

The several dogs 35 are thus returned to their respective normal positions, and the springs 38 draw them downwardly as soon as the hook portions 36 have passed the ends of the grooves 34. The engine clutch is still out when the various parts are in their respective normal or neutral positions. Further return movement of the clutch pedal will effect the engagement of the engine clutch, and the vehicle will be driven through the connections above described. The clutch can then be controlled as desired without, in any way affecting the transmission-gear mechanism, the pin-and-slot connection affording the necessary independent movement of the pedal lever 11.

When it is desired to change the speed ratio, as, for example, to second speed, the lever 16 may be moved to register with the corresponding numeral on the dial 14 at any desired time in advance of the actual change. The slot 41 is thereby brought into register with its corresponding dog 35 to perform the same functions as described in connection with the slot 40. To effect the change to the desired speed, the operator presses the pedal lever 11 to disengage the engine clutch. The rod 22 is in its shifted position and the left end of the groove 34 is near the coacting hook portion 36 of the adjacent dog 35 so that a slight outward movement of the latter member will cause these parts to engage. Further actuation of the pedal lever 11 after the clutch is out, operates, therefore, to first shift the rod 22 to its neutral position.

At this point, all of the dogs 35, except that one controlled by the slot 41 are engaged by the corresponding coacting bars 39 and the dogs 35 are rocked out of engagement with the respective shift rods 22 and 23. But, since the slot 41 is in register with its corresponding dog 35, the latter is still in its operative position, and further movement of the clutch-pedal lever 11 causes the rod 23 to be shifted to the left to effect the corresponding change in the transmission mechanism 4.

The return movement of the pedal lever operates as above described to return the selective mechanism to the neutral position and to return the blocks 26 and 27 and the dogs 35 to their respective normal positions. At the end of this return movement, the engine clutch is again engaged, and the vehicle will be driven at second speed. In the same manner, changes may be made to third speed or the direction of drive may be reversed by adjusting the lever 17 to register with the appropriate connections 3 and R, respectively. It will, of course, be understood that, in order to reverse the direction of movement of the vehicle, it is necessary to bring it to a stop before the clutch is engaged.

The transmission mechanism may be restored to its neutral condition at any time without previously moving the selector lever 16 because the latter is automatically restored to its neutral position after each adjustment of the transmission mechanism, as has been described. In this position of the selector lever, the bars 39 are so adjusted that none of the slots register with the corresponding dogs 35. The clutch is disengaged as before, whereupon the lever 30 is actuated by the rock shaft 31 to shift the blocks 26 and 27 outwardly. The shifted rod 22 or 23, as the case may be, is in position to be engaged immediately by the corresponding dog 35 to return it to its neutral position. When the dogs 35 reach the bars 39, all of the dogs are rocked out of the grooves 34 since none of the slots are in alinement with them. It is then impossible to actuate the shift rods until the selector lever has been shifted to a position other than in register with the letter N.

It will be noted that I provide a mechanism which comprises a simple arrangement whereby the selective controlling mechanism is automatically returned to its neutral position after each actuation of the shifting mechanism. This construction prevents any inadvertent adjustment of the transmission mechanism because it is first necessary to set the selector lever before any change in speed ratio can be established.

I claim as my invention:

1. In a gear-shifting mechanism, the combination with a shift rod, and actuating means therefor, of means for selectively controlling the connection of said actuating means to said rod, and means for automatically returning said controlling means to its normal position after each actuation of said rod.

2. In a gear-shifting mechanism, the combination with a shift rod, and means for actuating said rod in opposite directions, of means for selectively controlling the connection of said actuating means to said rod, and means for automatically returning said controlling means to its normal position after each actuation of said rod.

3. In a gear-shifting mechanism, the combination with a shift rod and means for actuating said rod in opposite directions from a neutral position, of means for selectively controlling the actuation of said rod, and means comprising a latching mechanism for controlling the return of said controlling means to its normal position.

4. In a gear-shifting mechanism, the combination with a shift rod, and means for actuating said rod in opposite directions from a neutral position, of means for selectively controlling the actuation of said rod, and means for automatically returning the controlling means to its normal position after each actuation of said rod, said means comprising a latching mechanism and means for releasing said latching mechanism at a predetermined point in its path of movement.

5. In a gear-shifting mechanism, the combination with a shift rod and means for actuating said rod in opposite directions from a neutral position, of adjustable means for selectively controlling the actuation of said rod, a clutch lever for operating said actuating means, and a latching mechanism for connecting said lever to said controlling means under predetermined conditions.

6. In a gear-shifting mechanism, the combination with a shift rod and means for actuating said rod in opposite directions from a neutral position, of adjustable means for selectively controlling the actuation of said rod, a clutch lever for operating said actuating means, and a latching mechanism for connecting said lever to said controlling means under predetermined conditions, and for disconnecting said lever from said means under predetermined conditions.

7. In a gear-shifting mechanism, the combination with a shift rod and means for actuating said rod in opposite directions from a neutral position, of adjustable means for selectively controlling the actuation of said rod, a clutch lever for operating said actuating means, said lever having a normal path of movement for controlling the usual engine clutch and an additional path of movement for shifting said rod, and means for connecting said lever to said adjustable means at one extremity of its additional path of movement and for disconnecting said lever from said adjustable means at one extremity of its normal path of movement.

8. In a gear-shifting mechanism, the combination with a shiftable gear wheel, of a member for shifting said gear wheel in opposite directions, mechanical means for actuating said member, mechanical means for selectively controlling said actuating means and means for restoring said controlling means to its neutral position after each operation of said shifting member.

In testimony whereof I have hereunto subscribed my name this 23rd day of Nov., 1914.

JOHN E. WEBSTER.

Witnesses:
  MARY M. STRANG,
  B. B. HINES.